United States Patent [19]
Larson et al.

[11] 4,221,985
[45] Sep. 9, 1980

[54] VEHICLE TACHOMETER GENERATOR

[75] Inventors: Gerald L. Larson; Roger F. Kuether, both of Battle Creek, Mich.

[73] Assignee: Eaton Corporation, Cleveland, Ohio

[21] Appl. No.: 896,544

[22] Filed: Apr. 14, 1978

Related U.S. Application Data

[63] Continuation of Ser. No. 713,030, Aug. 9, 1976, abandoned.

[51] Int. Cl.² .............................................. H02K 17/42
[52] U.S. Cl. ..................................... 310/171; 310/90; 310/112; 310/154; 310/168
[58] Field of Search .................. 310/154, 90, 168, 191, 310/169, 181, 170, 183, 158, 159, 112–114, 155, 166, 171; 322/47; 324/173, 174

[56] References Cited

U.S. PATENT DOCUMENTS

| | | | |
|---|---|---|---|
| 2,671,179 | 3/1954 | Blanchard | 310/171 |
| 2,832,908 | 4/1958 | Abbott | 310/171 |
| 3,445,697 | 5/1969 | Costa | 310/114 |
| 3,486,054 | 12/1969 | Livingston | 310/171 |
| 3,504,208 | 2/1970 | Rivers | 324/174 |
| 3,736,449 | 5/1973 | Honeywell | 310/171 |
| 3,790,832 | 2/1974 | Patel | 310/154 |
| 3,960,248 | 6/1976 | Tribe | 310/168 |
| 4,096,624 | 6/1978 | Gray | 310/168 |

*Primary Examiner*—R. Skudy
*Attorney, Agent, or Firm*—R. J. McCloskey; R. A. Johnston

[57] ABSTRACT

A dynamoelectric machine for generating an electric current having the frequency thereof proportional to the shaft speed of the machine. The generator is preferably of the permanent magnet type particularly suitable for use as a wheel speed indicator or tachometer-generator. The stator has an inner and outer tubular portion, with the inner portion disposed for limited radial movement with respect to the outer housing and having one end of the rotor journalled thereon for holding a substantially constant air gap at the rotary pole thereof. The limited movement of the inner stator portion is resisted by frictional forces created by the permanent magnet and by the axial bias of a thrust bearing. The remaining end of the rotor is journalled in a bearing registered in the outer stator housing. The machine gives magnetic saturation at the stator poles at 30% of rated speed and produces a strong signal output at low speeds.

13 Claims, 5 Drawing Figures

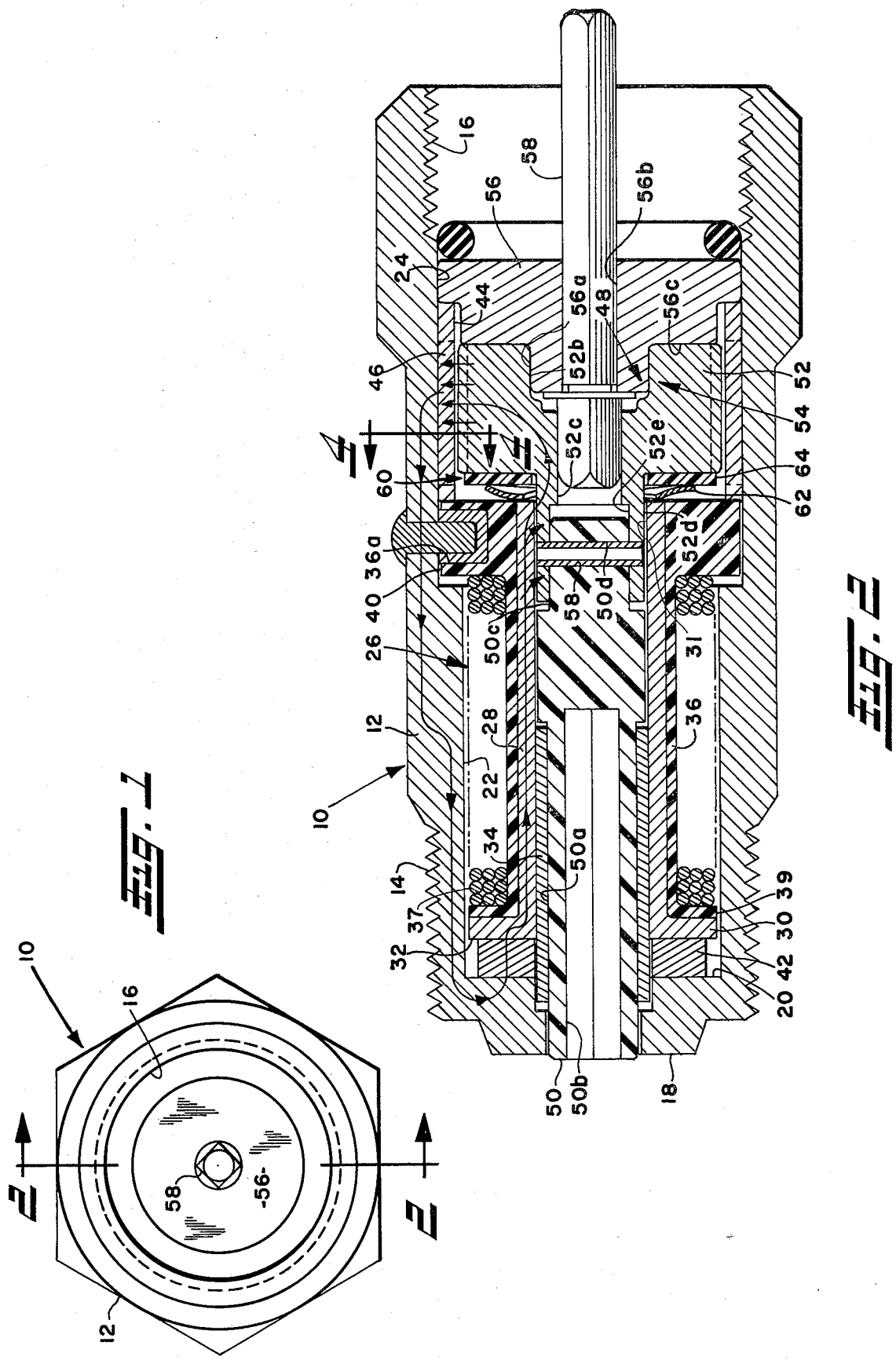

VEHICLE TACHOMETER GENERATOR

This is a continuation, of application Ser. No. 713,030, filed Aug. 9, 1976, now abandoned. su

BACKGROUND OF THE INVENTION

In providing tachometer generators for sensing vehicle wheel speed and providing an electrical signal having characteristics thereof proportional to the speed of the generator shaft, it has been found extremely difficult to provide a generator which produces a satisfactory signal at low shaft speed. Where external excitation of the generator coil is provided as, for example, direct current excitation of a coil for providing an electromagnet, in vehicular applications it has been found that, although the signal strength is maintained at a desired level, noise and distortion of the signal render the intelligible portion thereof unusable without excitation regulators.

For this reason, it has been desired to provide a permanent magnet type tachometer generator for use in sensing vehicle wheel speed. In particular, it has been found particularly convenient and desirable to attach a tachometer generator to the speedometer cable drive output which is conventionally provided on the tailshaft of the vehicle transmission for sensing the speed of the vehicle wheel drive shaft. Such an attachment is particularly useful since modification or adaptation of the wheel drive shaft train or axle housings or mounting is eliminated. The attachment of a tachometer generator to the wheel rotors subjects the generator to contamination by foreign matter and moisture in addition to severe mechanical shock loads from the bouncing of the wheels over rough road surfaces and measurement error caused by differential wheel speed. In order to provide a tachometer generator which will assemble into the conventional speedometer cable attachment on the transmission tail shaft has been found that, for a permanent magnet type tachometer generator requiring no external power excitation, it is extremely difficult to provide a signal of satisfactory strength and undistorted intelligence.

The problem is particularly acute when the problems of manufacturing such a tachometer generator at a very low cost and having a simple construction are taken into consideration. In particular, it is desired to make a tachometer generator of simple, yet rugged, construction without requiring sophisticated machining and tight tolerance control on the parts thereof, the design of the tachometer generator meeting such requirements and providing the desired signal output becomes extremely difficult.

The problem is additionally compounded by the wide range of temperatures and mechanical shock loads from the vehicle power plant drive train to which the tachometer generator is subjected during operation. These mechanical and thermal shock loads preclude ordinary techniques of generator design which employ massive and rigid bearings for accurately and concentrically retaining the rotor with respect to the stator for holding tight air gap tolerances between the rotating and stationary poles. Furthermore, where the generator is to be attached to the vehicle speedometer cable drive output on the transmission, size limitations preclude massive rotor and bearings. Therefore, it has long been desired to find a manner of constructing a tachometer generator of the permanent magnet type which yielded a strong undistorted signal at low speeds and yet one which exhibited sufficient ruggedness to withstand high speed vibration and mechanical and thermal shock loads to which the generator would be exposed in the vehicle transmission environment.

SUMMARY OF THE INVENTION

The present invention provides a dynamoelectric machine in the form of a tachometer generator providing an electrical signal having certain characteristics thereof proportional to the generator rotor speed. The present generator is of the permanent magnet type and provides a strong, undistorted signal at low rotor speed and is resistant to vibration and mechanical and thermal shock at high rotor speeds. The generator has a simple and rugged design which permits ease of manufacturing without requiring tight tolerances on the assembled components thereof and yet is compact in size sufficient to permit the generator to be assembled onto the speedometer cable drive output of a typical motor vehicle transmission tail shaft. The present generator is particularly suitable for providing vehicle speed sensing for the operation of speed responsive systems as, for example, mileage and fuel consumption indicators and vehicle road speed regulators.

The present generator has a stator formed of an outer iron casing with an inner tubular iron casing member and annular permanent magnet and an inner tubular stator member. The inner and outer stator members are magnetically in series with the permanent magnet and the inner stator member is permitted a limited amount of radial movement which is damped by frictional forces including those caused by the attraction of the permanent magnet for iron stator members. One end of the rotor is journalled in a bearing inside the inner stator member and the opposite end of the rotor is journalled in a bearing attached to the outer stator casing. The unique arrangement of journalling the rotor in the radially movable stator member permits very close contrast in almost a constant air gap between one pole of the rotor and a corresponding pole of the stator. The opposite pole of the rotor is segmented and rotates adjacent corresponding segmented sections of the remaining stator pole. The arrangement of the annular permanent magnet is floating arrangement with the stator and the radially limited movement of the inner stator member gives the present generator a high degree of resistance to thermal and mechanical shocks and vibrations and yet permits a large pole surface adjacent the air gap between the rotor and the stator to reduce resistance to flow of magnetic flux at low speed and thereby yield a strong signal output. A resilient thrust washer, or wave washer provides a nearly constant axial force to produce a nearly constant frictional damping of the limited movement of the floating stator member. One end of the rotor is journalled in the floating stator, which limits the radial loads on the bearing. In vehicular applications, the wide variation and extremes of temperature and shock loads encountered thus do not effect the present generator to the extent experienced in previously known generators.

BRIEF DESCRIPTION OF THE DRAWINGS

FIG. 1 is an end view of the generator of the present invention;

FIG. 2 is a section view taken along section indicating lines 2—2 of FIG. 1; and, FIG. 3 is a view in perspective of the second stator pole;

DETAILED DESCRIPTION

Figure 3:
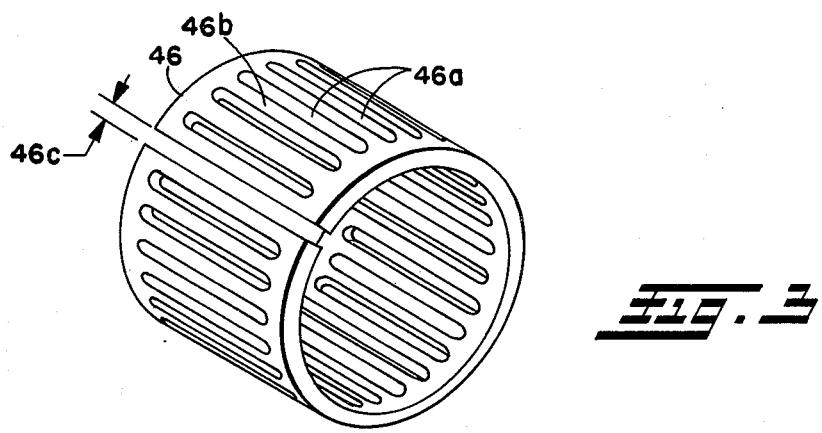
Figure 4:
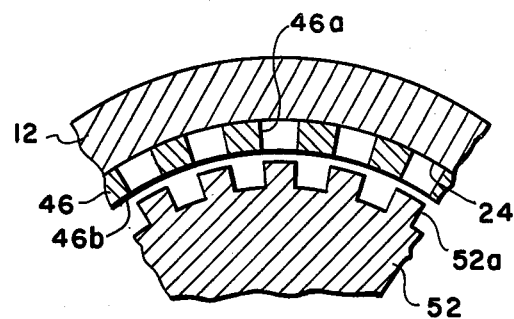
FIG. 4 is a partial cross-sectional view taken along the section indicating lines 4—4 of FIG. 2.

Referring now to FIG. 2, the dynamoelectric machine is shown in preferred form as a tachometer generator 10 having an outer stator member in the form of a tubular iron casing 12 having an externally threaded portion 14 adjacent one end thereof and an internally threaded portion 16 formed in the interior thereof adjacent the opposite end. In the presently preferred practice of the invention, the outer stator casing, or member, 12 is formed entirely of ferromagnetic material and has a radially inwardly extending flange 18 formed adjacent external thread 14 which flange extends inwardly substantially transversely of the tubular casing 12 and provides an axial registration surface 20 for magnetic contact. Axial registration surface 20 is also designated as a first axial outer magnetic pole. The inner periphery of the outer member 12 defines a bore 22 which intersects the inward flange 20 and a counterbore 24 is formed in the internally threaded end for receiving stator pole segments therein.

A stator subassembly 26 is received within the bore 22 in the outer casing in loosely fitting arrangement and is prevented from rotation therein by fastening means as, for example, terminal rivet anchored through the wall of the outer casing 12. The stator subassembly 26 comprises an inner stator member 28 having a generally tubular configuration and formed of ferromagnetic material. Inner stator member 28 is also designated as a tubular inner stator member. The inner stator member 28 has an outwardly extending flange portion 30 formed on one end thereof adjacent the external threads on the outer casing. A first stator pole 31 is formed by the rightward-most end of the internal diameter of inner stator member 28. In the presently preferred practice of the invention the outer stator member 12 and the inner stator member 28 are formed of low carbon iron as, for example, the alloy having Society of Automotive Engineers designation 12-L-14 and which is preferably stress relieved after machining. The inner stator member flange 30 has a surface extending generally transversely of the tubular configuration of the member, which surface 32 serves for contact magnetically and registration thereagainst in a direction axially of the configuration of the tubular stator inner member. Transverse surface 32 is also designated as a first axial inner magnetic pole.

A first bearing means 34 is received in the inner periphery of the stator inner member 28 and is adapted for journalling a rotor therein. In the presently preferred practice, the bearing means 34 comprises a bronze sleeve pressed into the interior of the inner stator member 28, which sleeve has a minimum preferred length of at least two diameters thereof. The remainder of the stator subassembly 26 comprises a bobbin 36 assembled over the outer periphery of the inner stator member 28, such as to prevent relative rotation therebetween, preferably in a press-fitting relationship. A coil conductor 37 of insulated wire is wound around bobbin 36 and is positioned within a magnetic flux path as shown in FIG. 2 by the line having spaced arrows, the effects of which will be subsequently described. In the preferred practice, the bobbin 36 is formed of electrically nonconductive material such as a heat resistant plastic and has an end flange 39 and formed adjacent one end thereof and in registration against the end flange 30 of the inner stator member. The bobbin has a second flange 40 disposed adjacent the opposite end thereof which flange 40 is of sufficient width to receive fastening means therein for preventing relative rotation of the stator subassembly with respect to the outer stator member.

A magnet 42, preferably of the permanently magnetized variety, and having an annular configuration with the poles thereof disposed on axially opposite ends, is received intermediate the registration surface 20 formed on the outer stator member and the registration surface 32 formed on the inner stator member, with the magnet poles in direct contact with the axial registration surfaces. In this arrangement, where a permanent magnet is used, the force of magnetic attraction from the magnet poles thus tends to maintain the stator subassembly 26 in axially fixed relationship within the bore 22 of the outer stator member. It will be apparent, however, that the aforesaid arrangement of the permanent magnet with the stator subassembly will permit limited radial movement of the stator subassembly along the axial registration surface 32 on the inner stator member flange and/or limited radial movement of the permanent magnet along the axial registration surface 20 formed on the outer stator member. In the preferred practice of the invention, the annular magnet 42 is formed of a ceramic material; and, a particular material sold under the trade designation "Magnite 5" sold commercially by Magnoceram Inc., South Plainsfield, N.J., has been found particularly suitable.

The outer stator member 12 and the inner stator member 28 are preferably formed of low carbon annealed iron material, for example, material having a Society of Automotive Engineers (SAE) designation 12-L-14, a free machining grade which has been found particularly suitable when stress relieved after machining.

A second stator pole 44 having magnetic attraction opposite that of the first stator pole 31 is formed on the inner periphery of bore 24 of the outer casing. The stator pole 44 is formed with a plurality of circumferentially spaced pole segments extending axially of the bore. With reference to FIG. 3, pole 44 is formed of a sleeve 46 of soft iron ferrous material having a plurality of circumferentially spaced longitudinally extending slots 46a formed radially through the wall of the sleeve. The sleeve material 46b circumferentially intermediate the slot 46a is thus adapted to form the pole segments for the second stator pole. Fluid material 46b is also designated as a second outer magnetic pole. The sleeve is sized to have its outer periphery closely interfit the bore 24 in the outer stator member, and the sleeve is so received therein. In the present practice the second stator pole has 28 of the segments 46b, for a sleeve 46 having an inner periphery of about 0.75 inches (1.9 centimeters) in order to provide the desired accuracy and resolution of the generator output signal. It has been found particularly suitable to form the sleeve 46 from a flat strip of metal perforated to provide the slots 46a, with the strip rolled to the approximate diameter of the bore 24 in the outer stator member. A circumferential gap 46c is provided to permit ease of assembly of the sleeve into the bore 24 and to provide radially compressive loading of the sleeve during assembly to insure contact of the outer periphery of the sleeve with the bore 24. If desired, the sleeve 46 may be formed of the same material as the stator casing 12.

Rotor means 48 is received in the stator member 12 and is journalled therein for rotation with respect thereto. The rotor means includes first shaft means in the form of a nonmagnetic driver section 50, which may be formed of any suitable plastic material and which has a bearing surface 50a journalled in closely fitting relationship in the inner periphery of bearing 34. The rotor driver member 50 has a polygonal bore 50b formed in the end thereof which bore is adapted for receiving therein in driving contact a polygonal shaft as, for example, the end of the speedometer cable for operating the vehicle speedometer. The driver member 50 has the opposite end thereof adapted for engagement with a driven rotor; and, in the preferred practice, engagement comprises a reduced diameter portion 50c and transverse aperture 50d for receiving fastening means therein. A driven rotor member 52, formed of ferromagnetic material, is received in the bore 24 in the stator casing 12 and has a plurality of pole segments 52a formed thereon in peripherally spaced axially extending arrangement. The width of the pole segments 52a will correspond, in width and number of segments, to the stator pole segments 46b. The rotor pole segments 52a have an outer diameter so as to form a radial air gap between the stator pole segments 46b to permit relative rotation with respect thereto. The rotor pole segments 52a and the stator pole segments 46b are also hereinafter designated as an outer pair of magnetic poles. An on/off switching of the flux flow across each pole of the stator to the next adjacent rotor pole thus occurs as the rotor is turned.

The right-hand end of rotor 52 has a counterbore 52b formed therein which serves as a bearing surface for the tail stock bearing of the rotor. A bearing means 54 is provided in the form of bronze retainer plate 56 having an outer diameter registering in closely fitting relationship with the counterbore 24 in the stator casing 12. A reduced diameter portion 56a is provided on the retainer 56 which bearing surface is received in slip fitting arrangement in the counterbore 52b in the right-hand or tail face of the rotor 52. The bearing retainer 56 thus journals the tail end of the rotor 52 in registration with and for rotation with respect to the outer stator casing 12. In the presently preferred practice, the bearing retainer 56 has a clearance aperture 56b provided centrally therethrough and the rotor has a through polygonal aperture 52c adapted for driving contact with the speedometer cable drive on the vehicle. A stub shaft 58 having a polygonal transverse section at the left end thereof is received in the rotor bore of corresponding polygonal transverse sections 52c for providing rotational driving thereto. The front or left-hand end of the rotor member 52 has a reduced diameter portion forming a second rotor pole 52d which portion is received in closely spaced relationship to the inner periphery of the inner stator member 28 in a manner so as to provide the second magnetic pole of the rotor. An air gap is thus defined between the rotor pole 52d and the first stator pole 31, across which gap magnetic flux is continually present during rotation of the rotor 52. The second rotor pole 52d and the first stator pole 31 are also hereinafter designated as an inner pair of magnetic poles. As shown in the upper half of FIG. 2 by the line having a series of spaced arrowheads, the magnetic flux generated by axially polarized magnet 42 follows a series circuit path through inner stator 28, across the air gap between first stator pole 31 and second rotor pole 52d, through rotor means 42, across the air gap defined by rotor pole segments 52a and stator pole segments 46b. A portion of the magnetic flux passes through coil conductor 37, whereby the above described on/off switching of the magnetic flux induces a flow of electrical current through coil conductor 37. A counterbore 52e is provided in the left-hand end of the rotor 52 and has the reduced diameter portion 50c of the driver rotor member received therein and retained with a cross pin 58 for transmitting rotary motion from the driven member 52 to driver member 50a. A thrust face 56c is provided on the face of the bearing retainer 56 for absorbing axial rotary contact with the rotor member 52.

A resilient thrust means 60 is provided in the form of a spring wave washer 62 which biases against a thrust washer 64 provided on the left hand face of the rotor with reference to FIG. 2, which spring washer 62 urges the rotor member 52 in driving contact with the thrust face 56c and, in reaction thereto, urges the stator subassembly leftward so as to increase the force on the registration surface 32 for providing frictional damping of the radial movement of the stator subassembly. The wave washer 62 thus provides a nearly constant axial force for producing the frictional radial damping of the stator subassembly along the flange registration surfaces 20,32 in contact with the magnet. Axial thermal expansion and contraction of the ports, therefore does not affect the frictional damping force. The wave washer 62 also gives the generator a high degree of resistance to mechanical shock loads.

It will be apparent from the foregoing description that the arrangement whereby the front or left-hand end of the rotor member 50 is journalled in the inner stator member bearing 34 and the tail end of the rotor member 52 is journalled in a bearing registering against the outer casing provides for maintaining a substantially constant air gap between the second rotor pole 52d and the inner periphery of the inner stator member at the inner stator pole 31. The rotor pole 52d and the inner periphery of the inner stator member at 31 are hereinafter designated as an inner pair of magnetic poles. This arrangement thus provides for minimum flux across the poles as the rotor begins to move and produces a strong signal at low rotor speeds with a minimum of distortion. In addition, the arrangement whereby the left end of the rotor is journalled in the floating inner stator member limits the radial loading of the bearing 34 to the valve, or magnitude, of the frictional damping forces between the magnet 42 and flange surfaces 20 and 32. This feature substantially reduces the wear of the bearing and the eccentricity of rotor pole 52d with respect to the inner stator pole 31. Thus, a nearly constant narrow, continuous flux air gap coupling is achieved between the rotor and inner stator member 28.

A recess 36a is provided in the outer periphery of the bobbin flange 40 at the right-hand or tail end of the bobbin, as mentioned above for receiving fastening means therein to prevent rotation of the stator subassembly with respect to the outer casing 12. In the preferred practice, fastening means comprises a rivet 66 received through an aperture in the wall of the outer stator casing, with the inward end of the rivet extending radially inwardly of the casing wall to register with an eyelet received in the recess 36a and thereby prevent rotation of the bobbin and stator subassembly 26. The electrical attachments to the ends of the coil conductor may be accomplished by providing an aperture (not shown) through any convenient location in the wall of the outer casing 12 and attaching suitable electrical leads to the ends of the coil conductor in any convenient manner known to those having ordinary skill in the art.

Figure 5:
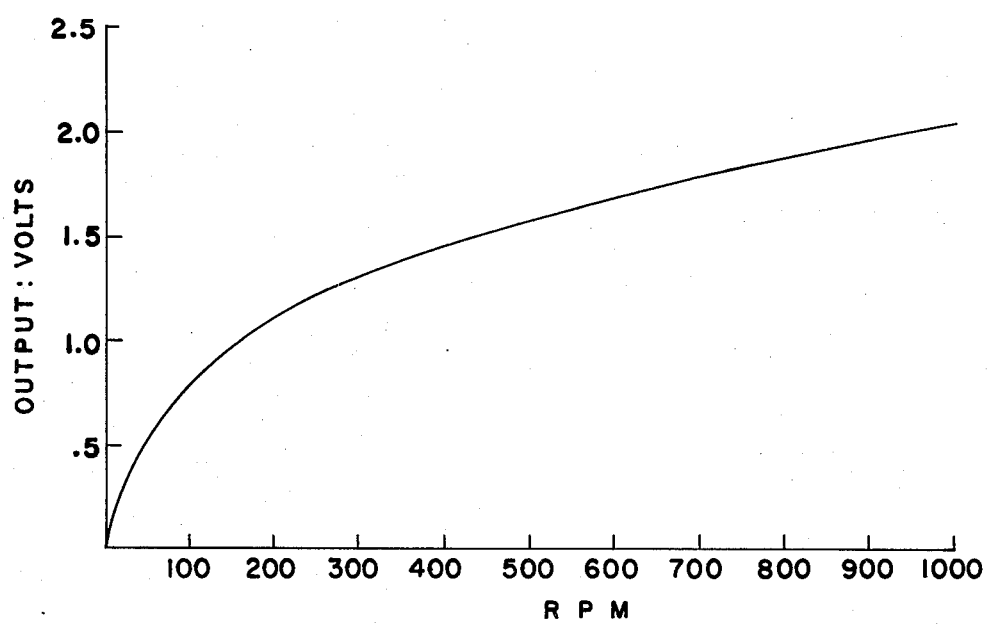
FIG. 5 is a graph ploted of signal output voltage versus rotor shaft speed.

Referring now to FIG. 5, a typical graph is plotted of voltage versus rotor speed. It will be apparent with reference to the graph of FIG. 5, that the output voltage of coil 28 rises rapidly at onset of rotor rotation and reaches nearly full output at 50% of its rated maximum operating speed of 1500 r.p.m. for brevity only the normal operating range of 0–1000 r.p.m. is shown in FIG. 5. The voltage versus r.p.m. curve of FIG. 5 in representative of the preferred form of the invention having a coil of 4000 turns of 38 gauge (0.158 mm) magnet wire rated for 130 C usage and wound on a bobbin having a diameter of 0.460 inches (11.6 mm) with a magnet having a diameter of about 0.75 inches (19 mm) and an axial thickness of about 0.100 inches (2.54 mm) and formed of the aforesaid "Magnite 5" material. The graph is representative of minimum acceptable signal output. It will be understood that variation in output will be attributable to the magnetic properties of the stator iron which is generall dependent upon the degree and extent of stress relieving after forming or machining. In the present practice, it is not unusual to have an output voltage of 3.0 volts at 1000 r.p.m.

The present invention thus provides a novel dynamoelectric machine having the magnet and the inner portion of the stator capable of limited transverse floating movement damped by frictional forces due to magnetic attraction of the parts and axial biasing by a preload spring. The generator provides nearly constant air gap between the rotor and stator poles by journalling one end of the rotor in the floating inner stator member. The newly constant and closely spaced air gap enables sufficient flux to flow thereacross to provide strong signal output at low rotor speeds.

Although the invention has been described in the presently preferred forms, modifications and variations will be apparent to those having skill in the art and the invention is limited only by the following claims.

What is claimed is:

1. A dynamoelectric machine for generating an alternating electric signal having the frequency thereof proportional to the shaft speed of the machine comprising:
   (a) casing means including an outer stator member defining interiorly thereof a bore adapted for receiving rotor means therein, said member having, with respect to said bore, an axial registration surface and a first magnetic stator pole of plural segments associated therewith;
   (b) a stator subassembly disposed within said bore and having,
      (i) inner stator means including a tubular inner stator member formed of ferromagnetic material and having portions thereof defining a second magnetic stator pole having a second contact surface adapted for registration thereagainst in a direction longitudinally of said bore;
      (ii) a coil of electrically conductive material, said coil having said inner stator member received therewithin,
      (iii) means electrically insulating said coil from said stator inner member, said coil and said insulating means cooperate to prevent relative movement of one with respect to the other; and,
      (iv) first bearing means disposed within said inner stator member;
   (c) means preventing relative rotation of said subassembly with respect to said casing about the axis of said bore, yet permitting movement of said subassembly transversely with respect to said bore;
   (d) magnet means disposed between said axial registration surface of said casing means and said second contact surface;
   (e) means resiliently biasing said stator subassembly in a direction longitudinally thereof, said biasing means urging said second stator contact surface toward said axial casing registration surface such that transverse movement of said subassembly in said bore is resisted by the friction of said contact;
   (f) rotor means received in said casing bore, said rotor means including,
      (i) means defining a first bearing surface, said bearing surface being journalled in said stator first bearing means,
      (ii) means defining a first magnetic rotor pole with plural segments, said segments being disposed adjacent, and closely spaced from, said segments of said first magnetic stator pole for rotation with respect thereto;
      (iii) means defining a second magnetic rotor pole axially spaced from said first pole, said second magnetic rotor pole being disposed within said stator inner member and closely spaced from said second magnetic stator pole for defining a continuous substantially constant flux air gap and for rotation with respect thereto,
      (iv) ferromagnetic means defining a continuous path for flow of magnetic flux between said first and second magnetic rotor poles;
      (v) means defining a second rotor bearing surface spaced axially from said first rotor bearing surface; and,
   (g) second bearing means received in said casing means
and journalled on said second rotor bearing surface and including means retaining said rotor means axially in said bore.

2. The machine defined in claim 1, wherein said magnet is a permanent magnet of annular configuration having spaced, magnetically axial-flow opposite poles and is disposed axially intermediate said casing axial registration surface and said stator contact surface.

3. The machine defined in claim 1, wherein,
   (a) said outer stator member has a registration surface formed on the inner periphery and disposed transversely of said direction of elongation and adjacent one end thereof;
   (b) said inner stator member has an axial registration surface formed thereon extending transversely of said direction of elongation and adjacent one end thereof; and,
   (c) said permanent magnet is disposed between the axial registration surfaces of said inner and outer stator members.

4. The machine defined in claim 1, wherein said permanent magnet has an annular configuration and is magnetically polarized in a direction axially of said annular configuration.

5. A dynamoelectric machine for generating an alternating electric signal having the frequency thereof proportional to the shaft speed of the machine, said machine comprising:

(a) casing means including an outer tubular stator member formed of ferromagnetic material having a portion adjacent one end defining interiorly thereof a first axial outer magnetic pole and having means disposed interiorly thereof defining a second outer magnetic pole having a plurality of circumferentially spaced pole segments axially spaced from said first pole;

(b) an annular magnetized member formed of ferromagnetic material having the magnetic poles thereof disposed on opposite axial ends thereof, said magnet being received in said outer tubular stator and having one pole thereof contacting said first axial outer magnetic pole;

(c) a tubular inner stator member formed of ferromagnetic material, said stator having portions thereof defining a first axial inner magnetic pole at one end thereof and other portions interiorly thereof defining a second inner magnetic pole adjacent the end opposite said first axial pole, said inner stator member being received in said outer stator member with said magnet disposed intermediate said first axial inner magnetic pole and said first axial outer magnetic pole;

(d) means resiliently biasing said first axial inner magnetic pole toward said first axial outer magnetic pole and frictionally retaining said magnet therebetween; and, (e) rotor means journalled for rotation within said inner stator member, said rotor means being magnetically in series circuit arrangement with said outer stator member, said magnet, and said inner stator member, wherein said inner stator member is permitted limited movement in a direction transversely of the axis of said rotor means, said limited movement being damped by frictional forces resulting from said resilient biasing and the magnetic force of attraction exerted by said magnet on said first outer magnetic pole and said first inner magnetic pole.

6. A dynamoelectric machine for generating an alternating electric signal, said machine comprising:

(a) a permanent magnet having an annular configuration with axially polarized opposed surfaces;

(b) stator means including,
  (i) a first stator member having at least portions thereof formed of ferromagnetic material, said first stator member having at least portions thereof formed of ferromagnetic material, said first stator member having an elongated tubular configuration and having a plurality of stator pole segments disposed in circumferentially spaced arrangement about the inner periphery thereof;
  (ii) a second stator member formed of ferromagnetic material, said second stator having an elongated tubular configuration and disposed within said first stator, said first and second stator members and said magnet being in magnetic series circuit arrangement;

(c) first bearing means disposed in said second stator member;

(d) second bearing means disposed in said first stator member;

(e) coil means disposed around said second stator member and having the windings thereof elongated axially, said coil means, said magnet and said second stator member forming a stator subassembly with said magnet being positioned axially remote from said stator pole segments with said coil means axially intermediate said pole segments and said magnet;

(f) rotor means including
  (i) shaft means having first means journalled in said first bearing means for rotation therein, and second means journalled in said second bearing means for rotation therein, and
  (ii) a rotor member formed of ferromagnetic material having one end connected to said first journalled means and the other end connected to said journalled means, said rotor member having a first section disposed within said second stator, said first rotor section defining a flux return surface spaced radially closely adjacent the inner periphery of said second stator for defining therebetween a substantially constant air gap of minimal reluctance, said rotor member having a plurality of circumferentially spaced rotor pole segments spaced radially closely adjacent said plurality of stator pole segments and axially spaced from said flux return surface for defining a variable flux air gap upon rotation of said rotor means with respect to said stator subassembly, said stator subassembly, said magnet, said first stator, said constant air gap, said rotor member, said rotor pole segments, said variable air gap, and said stator pole segments define a series flux path and wherein said elongated coil is affected by flux changes over the portion of said stator members extending the full axial length of said coil, thereby providing optimal signal output for any given permanent magnet strength.

7. A dynamoelectric machine for generating an alternating electric signal, said machine comprising:

(a) casing means, said casing means including
  (i) a first stator member having at least portions thereof formed of ferromagnetic material, said first stator member defining a plurality of circumferentially spaced pole segments at one end thereof and a first registration surface at the other end thereof;
  (ii) a second stator member having at least portions thereof formed of ferromagnetic material and disposed closely adjacent and within said first stator member, said second stator member defining a second registration surface.

(b) magnet means disposed intermediate said first and second registration surfaces and attracting said surfaces thereagainst;

(c) first bearing means disposed in said second stator member and adapted for journalling rotor means therein;

(d) coil means disposed on said second stator member, wherein said coil means, said second stator member and said bearing means form a stator subassembly;

(e) means mounting said stator subassembly in said casing means, said mounting means permitting limited movement of said subassembly in a direction transversely of the axis of rotation of said bearing means, said mounting means including means providing frictional force damping of said limited transverse movement, said damping including frictional forces produced by magnetic attraction of said magnet means;

(f) rotor means including first shaft means journalled in said first bearing means rotation therein, said rotor means including second shaft means connected to said first shaft means, said second shaft means having at least portions thereof formed of ferromagnetic material and spaced closely adjacent and rotatable with respect to said second-stator member, said rotor means including means defining a plurality of circumferentially spaced pole segments disposed closely spaced from and for rotation with respect to said first stator pole circumferentially spaced segments and defining a variable flux air gap therebetween, wherein said magnet means and said first and second stator members and said rotor means are disposed magnetically in series circuit arrangement;

(g) second bearing means supported on said casing means and having said shaft means journalled therein for rotation with respect thereto; and (h) wherein radial movement of said second stator member relative to said first stator member is resisted by frictional forces created by the force of magnetic attraction between said first and second registration surfaces and said magnet means.

8. The machine defined in claim 7, wherein said means is a permanent magnet having an annular configuration with opposite poles disposed axially thereof.

9. The machine defined in claim 7, wherein,
(a) said magnet means is a permanent magnet having an annular configuration with opposite poles disposed axially thereof; and,
(b) said means providing said frictional damping includes resilient means biasing said rotor means and said second stator member axially in opposing directions.

10. The machine defined in claim 7, wherein said rotor means includes,
(a) a first rotor member formed of ferromagnetic material and having said first and second rotor poles formed therein; and,
(b) a second rotor member formed of nonferromagnetic material attached to said first rotor member adjacent said second rotor pole, said second rotor member having portions thereof journalled in said first bearing means.

11. The machine defined in claim 7, wherein,
(a) said first stator member has an elongated annular configuration;
(b) said second stator member has an elongated annular configuration and is disposed centrally within said first stator member, and,
(c) said magnet comprises a permanent magnet having an annular configuration with the magnetic poles thereof disposed on opposite axial ends thereof.

12. The machine defined in claim 11, wherein,
(a) said first stator member includes an inwardly extending flange adjacent one end thereof, said flange having a surface thereon for registration thereagainst in a direction axially of said annular configuration;
(b) said second stator member includes an outwardly extending flange adjacent one end thereof, said flange having a surface thereon for registration thereagainst in a direction axially lf said annular configuration; and (c) said magnet means is disposed intermediate said first and second stator flanges and in magnetic contact therewith such that said limited movement of said stator subassembly occurs along at least one of said axial registration surfaces of said flanges.

13. A dynamoelectric machine for generating an alternating electric signal, said machine comprising:
(a) stator means, including,
(i) a magnet,
(ii) an elongated hollow outer stator member having portions thereof formed of ferromagnetic material, and said outer stator member having a plurality of circumferentially spaced pole segments disposed about the inner periphery thereof,
(iii) an elongated hollow inner stator member having portions thereof formed of ferromagnetic material received in said outer member, said magnet mounted in association with said outer stator member and said inner stator member for defining a continuous ferromagnetic path for the flux from said magnet;
(b) first bearing means attached to said inner member, said bearing means being adapted for receiving rotor means therein;
(c) a coil of electrically conductive material disposed about said inner member, wherein said inner member, said bearing means and said coil form a stator subassembly, with said coil having the opposite ends of said conductor adapted for electrical attachment thereto for conducting current therefrom;
(d) means retaining said stator subassembly within the hollow of said outer member, said retaining means resiliently biasing said subassembly against longitudinal movement of said subassembly with respect to said outer member, but permitting limited transverse movement thereof, said limited movement being opposed by frictional forces created by said magnet and by said resilient retaining means;
(e) means preventing relative rotation of said subassembly with respect to said outer member about an axis disposed longitudinally thereof;
(f) rotor means including means received in said first bearing means and journalled for rotation therein, said rotor means including means defining a first magnetic pole disposed in closely spaced relationship for rotational movement with respect to said second stator pole and defining a substantially constant irst flux air-gap therebetween, said rotor means further including means defining a second magnetic pole having a plurality of segments corresponding to and disposed in closely spaced arrangement with said segments of said first stator pole for rotational movement with respect thereto and defining a second flux air-gap therebetween, said second flux air gap varying with rotation of said rotor means, wherein said magnet, said outer hollow stator member, said rotor means, and said hollow inner stator are disposed magnetically in series circuit arrangement; and,
(g) second bearing means supporting said rotor means for rotation in said casing means, said second bearing means being disposed in axially spaced arrangement with said first bearing means.

* * * * *